H. W. DYER.
SPRING BUMPER.
APPLICATION FILED OCT. 1, 1919.
1,393,354.
Patented Oct. 11, 1921.
2 SHEETS—SHEET 1.
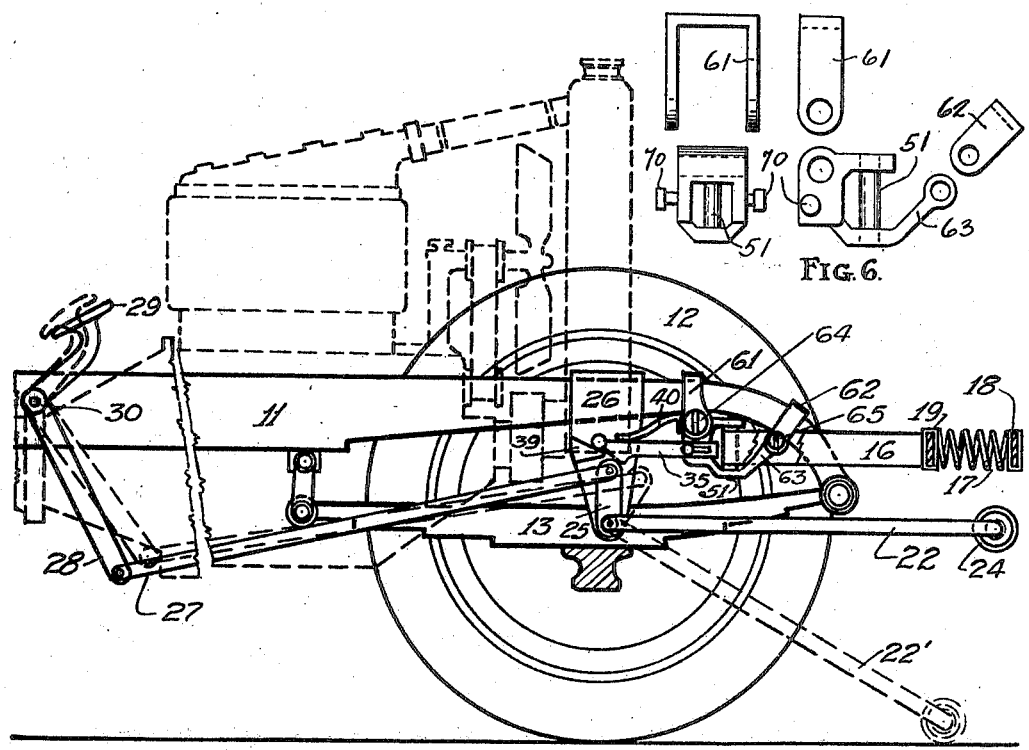
FIG. 1
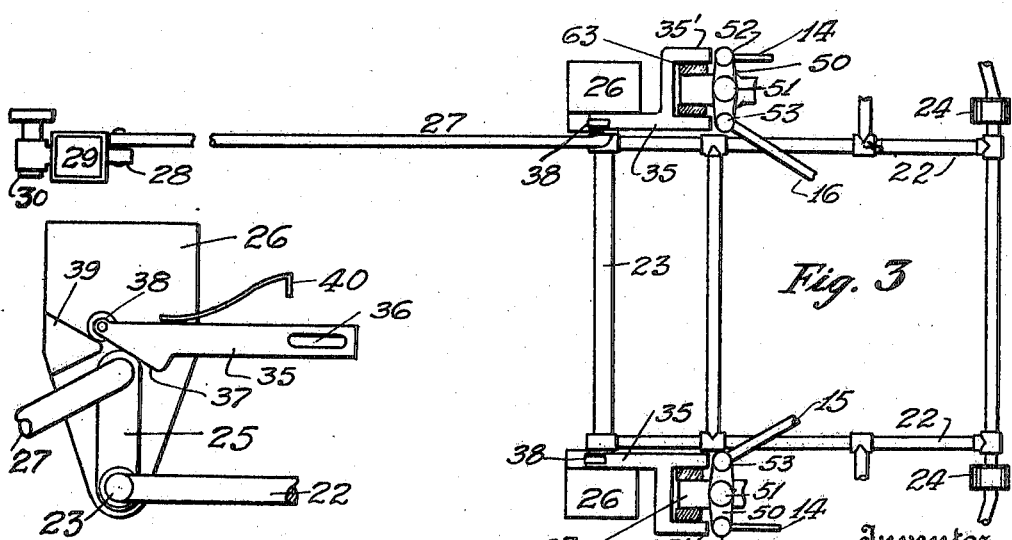
Inventor
Harry W. Dyer,
By his Attorney

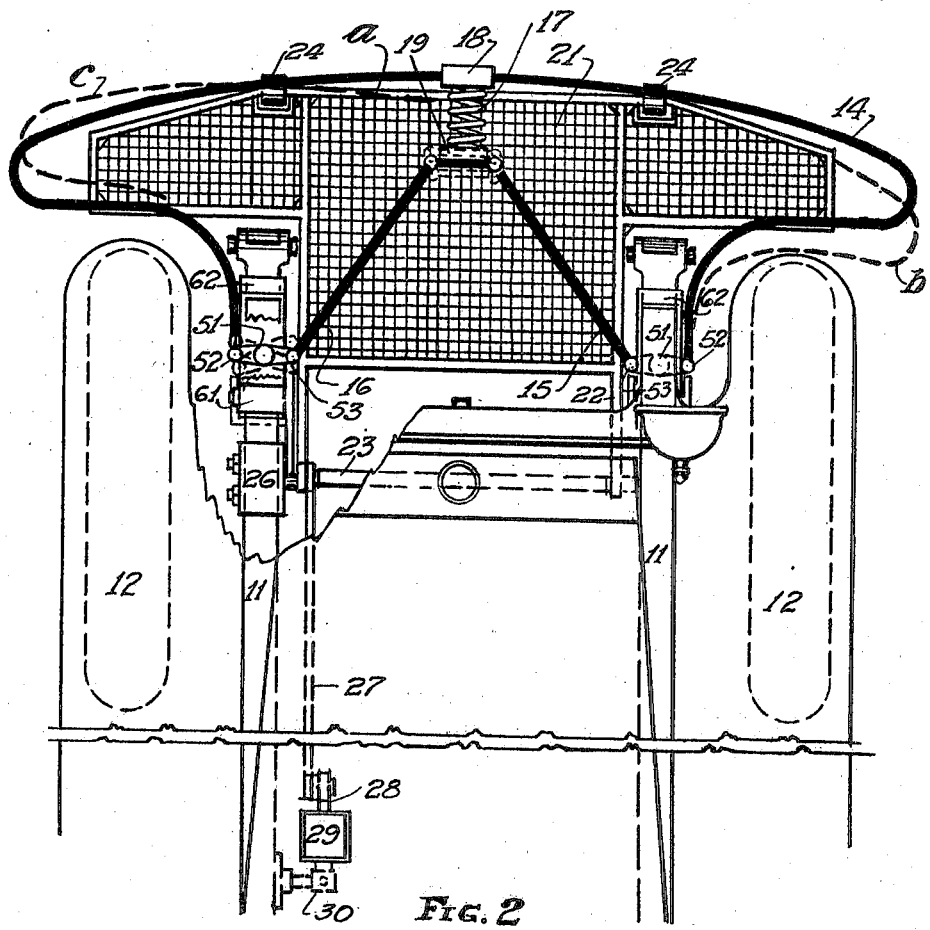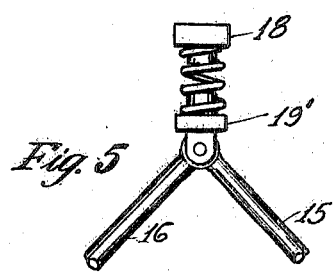

UNITED STATES PATENT OFFICE.

HARRY W. DYER, OF EAST ORANGE, NEW JERSEY.

SPRING-BUMPER.

1,393,354.   Specification of Letters Patent.   Patented Oct. 11, 1921.

Application filed October 1, 1919. Serial No. 327,688.

*To all whom it may concern:*

Be it known that I, HARRY W. DYER, a citizen of the United States, and resident of East Orange, in the county of Essex and State of New Jersey, have invented certain new and useful Spring-Bumpers, of which the following is a specification.

This invention relates to spring bumpers and more particularly to bumpers such as are used on automobiles, and has for an object to increase the safety secured by the use of such devices, also to provide a spring bumper by the combination of a flat and coil spring so arranged that each of these springs bears a proportional part of the thrust from any point of application: also to provide a safety fender which will guard a car from running over an object struck by the bumper. Other objects will appear from the following specification and drawings in which—

Figure 1 is a side elevation partly in section showing my invention applied to an automobile. Fig. 2 is a plan view corresponding to Fig. 1 with certain parts broken away to show the method of application. Fig. 3 is a detail of certain connections for the safety fender, Fig. 4 is an enlarged detail of the latching features for this fender, Fig. 5 shows a modification in its application, and Fig. 6 shows the detailed parts of the attaching brackets.

In the drawings 11 indicates the frame of the automobile, 12 indicates the front wheels and 13 is the usual form of elliptical spring.

The features of my invention relating to the bumper itself are best shown in Fig. 2. The flat spring 14 has a contour as shown, and extends across the front of the car beyond the plane of the front wheels. This flat spring forms the bumper and is supported at three points, the two ends being secured at 52, 52 to the levers 50—50 which are pivoted at 51—51 to brackets carried by the frame 11 hereafter more particularly described. The third point of support consists of the yoke 18 through which the spring 14 is passed. This holds the spring in a horizontal plane in front of the car and in such a position as to engage obstructions. To the inner end of the levers 50 the thrust rods 15, 16 are pivoted at 53, 53 and the opposite ends of these thrust rods support the pad 19 to which one end of coil spring 17 is secured. The opposite end of this coil spring being secured to the yoke 18. In the modification, Fig. 5 the pad 19′ is designed so that rods 15 and 16 connect to the same point.

From this arrangement it will be observed that a thrust imparted to the spring 14 at any point is distributed throughout the spring and, in addition, is proportionately distributed to the coil spring 17, thus obtaining the utmost resiliency to absorb shocks and jars, such as this device receives under normal conditions. For instance: assume that the bumper receives a thrust in the center: this will deflect the spring 14 to a position indicated by the dotted line at $a$. This places a direct compression on the coil spring 17, which by the thrust rods 15, 16 is imparted to the levers 50, 50. This, in turn, forces the outer ends of these levers forward causing the ends of the flat spring to assume a position corresponding to dotted line indicated at $c$. This condition is balanced on each side of the spring 14, so that the thrust is entirely distributed throughout the spring 14 and the coil spring 17. Suppose now that spring 14 received a thrust at one side deflecting it to a position indicated by the dotted line at $b$. This will move the adjacent lever 50 in such a way as to move the thrust rod 15 to compress the coil spring 17 against the center of the spring 14. Changing the position of pad 19 through the thrust rod 15 changes the position of thrust rod 16 correspondingly which in turn moves the lever 50 on the opposite side of the frame and thus transmits part of the thrust to the opposite side of spring 14.

An important feature of my invention consists in the method of attaching the bumper spring to the automobile frame whereby this spring is always positioned horizontally for any contour of frame to which the attachment is made. This consists of the brackets 61, 62 supporting the pivot piece 63 by the bolts 64 and 65. The pivot pins 51 for the levers 50 must be maintained in a vertical position to preserve the alinement of the buffer spring. When the attachment is made pivot piece 63 is positioned to place pin 51 vertical, brackets 61 and 62, however, are free to turn on bolts 64 and 65 and can thus be turned at any angle to suit the curve of the car frame before they are clamped in position without disturbing the vertical position of the pin 51. This also preserves the alinement of latch 35 with relation to piece 63.

A consideration of this arrangement will show that by the use of the levers to which the ends of spring 14 are pivoted and the thrust rods transmitting motion from these levers to compress the coil spring 17, a thrust imparted to any point of the bumper spring 14 tends to distribute itself throughout its entire length, while a certain portion of this thrust is absorbed by the coil spring. This provides a bumper of the utmost resiliency that is light in weight and that can stand heavy shocks without danger of breaking and with the minimum effect upon the object struck.

In order to increase the safety secured by devices of this kind I also provide a fender which, under normal conditions, is maintained in a horizontal position close to the frame of the automobile and therefore, out of the way. When, however, the bumper is compressed from any point means are provided whereby this fender is released and immediately drops to the pavement forming an incline plane which will collect any objects on the roadway instead of leaving these objects to form an obstruction to the automobile. I further provide a convenient means operated from the driver's seat whereby the fender can be restored to its normal position without stopping the car and without inconvenience.

This feature of my invention is illustrated in Figs. 1, 3 and 4. A preferably tubular frame 22 is secured on shaft 23 which is, in turn, pivoted on brackets 26, 26 secured at each side to the frame 11. This frame 22 is provided with a wire netting 21, which forms a holder for any objects that may collect. Rollers 24, 24 are provided on the front bar of this frame to engage the roadway when it is deflected as indicated at 22', Fig. 1. This frame is deflected to the roadway by rotating shaft 23, which is controlled by crank 25. This crank is latched in position by the latch rod 35, Fig. 4. The inclined face 37 of this latch rod engages the end of the crank as shown under the pressure of spring 40 in such a way as to maintain it in position and thus maintain the screen 21 in a horizontal position under the bumper. When the latch rod 35 is moved to the left as indicated in Fig. 4, the roller 38 engages the inclined plane 39 secured to the bracket 26, thus causing the latch to release the crank and drop the screen.

Means are provided in the operation of the levers 50, 50 to release this latch rod thus automaticaly releasing the screen and permitting it to drop to the operative position by the same action which compresses the bumper. In Fig. 3 it will be observed that latch rods 35, 35 straddle the pivot piece 63 one end of which is positioned to engage the lever at 53 and the other end 35' is positioned to engage the lever at 52. This construction is provided on each side of the automobile. Now if compression is applied at any point to spring 14 one end of the lever is moved back to engage the latch rod and drive it up the incline plane 39 thus releasing the crank 25. Pins 70 in bracket 63, Fig. 6, engage in the latch rod 35 providing for this movement. This latch rod is restored to its normal position immediately the pressure on the bumper is removed by reason of spring 40 forcing it down the incline plane. However, a retractile spring may be provided specifically for this purpose.

Convenient to the driver's seat I provide pedal 29 pivoted to the frame at 30 and having the extension 28 which engages the rod 27, the opposite end of this rod in turn being pivoted to the crank arm 25. When the fender is in the inclined position, therefore, it can be conveniently and instantly elevated by the pressure of the foot on pedal 29. This will be readily understood by the movements from the dotted positions of the full line positions indicated in Fig. 1.

By this construction it will be observed that I have provided a superior construction in a bumper arranged to distribute the thrust throughout the spring members from any point of application and in combination therewith I provide a safety fender which is automatically brought into use by the thrust from the bumper thus affording the utmost protection to the car and to obstructions in its way.

Having thus described my invention I desire to secure by Letters Patent the following claims:

1. In a bumper of the class described the combination of a semi-elliptical spring supported at three points in a horizontal position, one of said supports applied at the middle and one at each end of said spring and all of said supports being yieldable on compression.

2. In a bumper of the class described, the combination of a semi-elliptical spring supported at three points in a horizontal position, the ends of said spring being secured each to a pivoted lever and the center of said spring secured to a coil spring.

3. In a bumper of the class described, the combination of an automobile body with a semi-elliptical spring, a plurality of levers pivotally secured to said body, the ends of said spring connecting to the ends of said levers and thrust rods connecting the opposite ends of said levers with the center of said semi-elliptical spring.

4. In a bumper of the class described, the combination of an automobile body with a semi-elliptical spring, a plurality of levers pivotally secured to said body, the ends of said spring connecting to the ends of said levers, thrust rods connecting to the opposite ends of said levers and a compression spring connecting said thrust rods with said semi-elliptical spring.

5. In a bumper of the class described, the combination of an automobile body with a semi-elliptical spring, a plurality of levers pivoted to said body and supporting the ends of said spring, a compression spring connected to said semi-elliptical spring and connections from said compression spring to said levers whereby a thrust imparted to any point of said semi-elliptical spring is proportionately absorbed by said compression spring.

6. In a bumper of the class described, the combination of an automobile body with a semi-elliptical spring and a coil spring, the ends of said semi-elliptical spring supported by connections pivoted to said body, means connecting said coil spring with said connections and with said semi-elliptical spring.

7. In a bumper of the class described, the combination of an automobile body with a semi-elliptical spring and a compression spring, connections pivoted to said body and connecting said springs whereby a thrust imparted to said bumper is proportionally distributed between said semi-elliptical spring and said compression spring.

8. In a bumper of the class described the combination of an automobile body with a semi-elliptical spring, levers pivoted to said body, the ends of said semi-elliptical spring connecting each to one end of said levers, a compression spring secured to said semi-elliptical spring, and means for compressing said compression spring by the movement of said levers.

9. In a bumper of the class described the combination of a semi-elliptical spring supported at each end by an equalizing connection and supported by a compression spring in the center, means whereby a thrust imparted to the center of said semi-elliptical spring is distributed through said compression spring to the extremities of said semi-elliptical spring.

10. In a bumper of the class described, the combination of a vehicle with a bumper spring carried on supports yielding against compression, a safety fender having an active and an inactive position, said active position forming an inclined plane in front of said vehicle and said inactive position locating said fender close to and parallel with the plane of said bumper, means for retaining said fender in the inactive position, means for bringing said fender into the active position by compression of said bumper spring and means operated from the driver's seat of said vehicle for restoring said fender to the inactive position.

11. In a bumper of the class described, the combination of a vehicle with a bumper spring carried on supports yielding against compression, a safety fender having an active and an inactive position, said active position forming an inclined plane in front of said vehicle and said inactive position locating said fender close to and parallel with the plane of said bumper, means for holding said fender in the inactive position, means for bringing it into the active position by compression of said bumper spring and a foot pedal operated from the driver's seat for restoring said fender to the inactive position.

12. In a bumper of the class described, the combination of a vehicle with a pumper spring supported by levers pivoted to the frame of said vehicle and so arranged that compression of said spring imparts motion to said levers, a safety fender having an active and an inactive position, a latch for retaining said fender in the inactive position against gravity and means for releasing said latch by motion of said levers.

13. In a bumper of the class described, the combination of a vehicle with a bumper spring, a plurality of levers pivoted to the frame of said vehicle, the ends of said bumper spring connecting each to the ends of said levers, a central connection from said bumper spring connecting to the opposite ends of said levers, a safety fender having an active and an inactive position, a latch holding said fender in the inactive position against gravity and means for releasing said latch by a movement of either of said levers.

14. In a bumper of the class described, the combination of a vehicle with a bumper spring, vertically positioned pivots for supporting said spring, means for securing said pivots to the frame of said vehicle and means for positioning said pivots.

15. In a bumper of the class described, the combination of a vehicle with a bumper spring, vertically positioned pivots supporting said spring, a plurality of brackets securing said pivots to the frame of said vehicle and means for positioning said pivots independently of the position of said brackets relative to said frame.

16. In a bumper of the class described, the combination of a vehicle with a bumper spring, positioned pivots supporting said spring, a plurality of brackets secured to the frame of said vehicle, a member pivotally connected to said brackets, said member arranged to position said pivots.

17. In a bumper of the class described, the combination of a vehicle with a bumper spring a plurality of brackets clamped to the curved frame of said vehicle, a member pivotally secured to said brackets and supporting said spring, means for positioning said brackets to suit the curvature of said frame and means for positioning said bumper spring.

18. In a bumper of the class described, the combination of a vehicle with a safety fender, a plurality of brackets clamped to the curved frame of said vehicle, a member pivotally secured to said brackets, a latch for said fender supported by said member, and means for alining the position of said latch independently of the position of said brackets relative to said frame.

19. In a bumper of the class described, the combination of a vehicle with a bumper spring, a plurality of brackets clamped to the frame of said vehicle on either side, members pivotally secured to said brackets on either side, levers pivotally secured to said members and the ends of said bumper spring secured to said levers.

Signed at New York, in the county of New York and State of New York, this 25th day of September, A. D. 1919.

HARRY W. DYER.